United States Patent [19]
Ben Aim et al.

[11] Patent Number: 4,569,759
[45] Date of Patent: Feb. 11, 1986

[54] TANGENTIAL FILTRATION APPARATUS AND PLANT COMPRISING SUCH APPARATUS

[75] Inventors: Roger Ben Aim; Daniel Bourdiol, both of Layrac; Francois Fiessinger, Chaville; Jean-Marie Rovel, Rueil Malmaison, all of France

[73] Assignees: Societe Lyonnaise des Eaux et de l'Eclairage, Paris; Degremont, Rueil Malmaison; Institut de la Filtration et des Techniques Separatives Foulayronnes, Agen, all of France

[21] Appl. No.: 593,251

[22] Filed: Mar. 22, 1984

[30] Foreign Application Priority Data

Mar. 24, 1983 [FR] France ................. 83 4827

[51] Int. Cl.⁴ .............................................. B01D 29/00
[52] U.S. Cl. ...................... 210/304; 210/336; 210/512.1
[58] Field of Search ............... 210/304, 314, 316, 336, 210/512.1, 512.2

[56] References Cited

U.S. PATENT DOCUMENTS

| | | | |
|---|---|---|---|
| 2,257,244 | 9/1941 | Oehler | 210/304 |
| 3,042,502 | 7/1962 | McGauley | 210/512.2 |
| 3,232,436 | 2/1966 | Nilsson | 210/304 |
| 3,723,309 | 3/1973 | Garcia | 210/512.2 |
| 3,929,636 | 12/1975 | Turner | 210/512.2 |
| 3,959,143 | 5/1976 | Arvanitakis | 210/304 |
| 4,359,386 | 11/1982 | Crema | 210/336 |

*Primary Examiner*—John Adee
*Attorney, Agent, or Firm*—Wenderoth, Lind & Ponack

[57] ABSTRACT

A filtration apparatus includes at least one tangential filtration module having at least one filtration element defining a conduit arranged in a spiral configuration within an enclosure in the form of a body of revolution. The element defines a helicoidal slope for liquid to be filtered and causes such liquid to pass through the module along a helicoidal path. The liquid is tangentially filtered, and filtrate is delivered to the exterior of the module.

7 Claims, 5 Drawing Figures

TANGENTIAL FILTRATION APPARATUS AND PLANT COMPRISING SUCH APPARATUS

BACKGROUND OF THE INVENTION

The present invention relates to a tangential or cross-flow filtration apparatus applicable to the filtration of fine particles suspended in liquids, more particularly in water treatment plants in the agrofood processing and biological manufacturing industries, for example, for the production of extremely pure water, for the disinfection of industrial waste waters, for the sterilization of drinking water, fruit juices or food liquids, for the separation of cellular biomass and, more generally, for any advanced decontamination of liquids and any treatment accomplished on a microporous ultrafiltration or on a microfiltration membrane.

The tangential or cross-flow filtration principle is well known and involves creating a relative displacement at a high velocity of the suspended matter to be filtered and of a porous filtering material in order to avoid or to limit the formation of cakes of the filtered matter on the filtering material. This technique permits filtering of suspended fine particles ranging from 0.1 to a few tens of microns in microfiltration and even of macromolecules with a molecular weight in excess of 10,000, e.g. in ultrafiltration, for which the conventional filtration methods by percolation lead to very low velocities of the filtrate due to very rapid plugging of the filtering material or to the formation of a cake with ever-increasing thickness.

The tangential filtration technique permits a high velocity of filtration and a continuous or semicontinuous operation. Moreover, it permits a perfect definition of the desired degree of filtration in accordance with the geometric characteristics of the filtering material employed.

Several types of filtering elements already have been described and which enable such tangential filtration to be accomplished. The oldest apparatus known, described in Soviet Pat. No. 142,626 to Zhevnovatyi, A. I. in 1961, is formed by a tube of porous material fixed inside a second tube, the suspension to be filtered passing under load at high velocity in the annular space between the two tubes, the filtrate flowing within the porous tube.

Since then, the filtering materials employed have been improved, as well as the flow of the liquid to be filtered. Thus, certain equipment uses two concentric cylinders, with the internal cylinder being formed by a microporous membrane, the liquid being subjected to a forced helicoidal flow around such internal cylinder.

Other devices comprise a series of filtering elements superposed in the form of plates or disks, on the two faces of which microporous membranes are arranged, for example, around a filtrate-collecting tube, the suspension to be filtered passing between the disks in a helicoidal path one after another.

There also are devices with rotating plates with greater mechanical complexity capable of producing corrosion phenomena.

However, the main problem is still the control of the flow of the liquid to be filtered, its distribution on the plates and on the disks, and the limitation due to loss of head of the necessary high speed circulation.

Moreover, the advantageous modular adaptation of the equipment to a particular problem at hand and for ready access to the porous material is usually obtained at the expense of an adequate distribution of the flow.

SUMMARY OF THE INVENTION

The present invention overcomes these drawbacks by enabling, in an easily washable and readily removable modular apparatus, the liquid to be filtered to flow along a helicoidal path, the major portion of the volume of the apparatus being reserved for the flow so as to minimize the loss of head, which is likely to reduce the flow velocity of the liquid.

The invention comprises a filtration apparatus having at least one tangential or cross-flow filtration module, at least one inlet for introducing the liquid to be filtered, and at least one orifice for the discharge of the filtrate. Each module comprises at least one filtration element consisting of a conduit arranged in a spiral within an enclosure in the form of a body of revolution and which, since it forms a helicoidal slope for the liquid to be filtered, causes the liquid to pass through the module along a helicoidal path, the filtrate flowing within the conduit from whence it is carried away outside of the module.

BRIEF DESCRIPTION OF THE DRAWINGS

The various features and advantages of the invention will become apparent from the following description, given solely by way of non-limitative example, with reference to the accompanying drawings, in which.

DETAILED DESCRIPTION OF THE INVENTION

Figure 1:
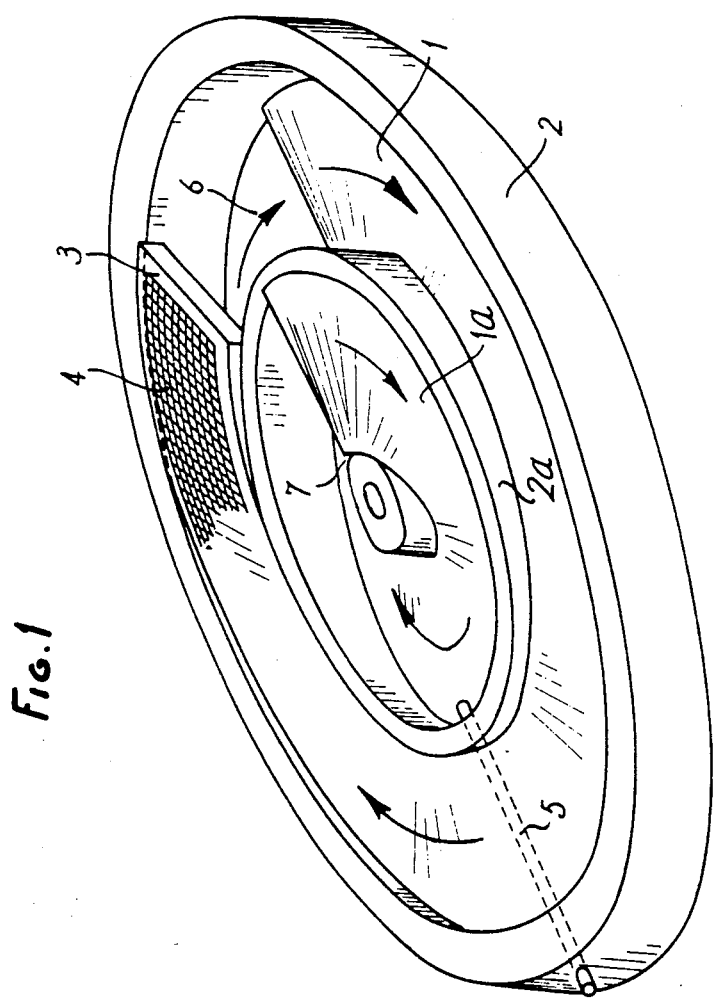
FIG. 1 is a perspective view of a filtration module embodying the invention.

In the embodiment shown in FIG. 1, the filtration module of the invention comprises two filtering elements 1 and 1a in the form of a conduit, and each of which has a rectangular cross section in the example described herein but can also be trapezoidal, and arranged in two concentric helixes with opposing pitch, within concentric respective cylindrical enclosures 2, 2a made of any suitable material. The enclosures may also have any other, more or less related, form, e.g. conical.

Each helicoidal filtering element is made of a filtering material which defines walls in contact with the liquid to be filtered, which advantageously can be a wire gauze, a woven material consisting of any suitable textile fiber, a felt, a nonwoven member, a sintered body, a porous membrane obtained from natural or synthetic materials, etc., and which is arranged on the two faces of a helicoidal member. Advantageously, each helicoidal element does not extend over the entire circumference, but is limited to a sector less than 360°. It will be seen hereinafter why such an arrangement is desirable. Each helicoidal filtering element is made integral with the respective enclosures 2, 2a by any suitable means, such as adhesive bonding, crimping, welding, etc. The surfaces 3, both upper and lower, of each element are provided with grooves 4 which carry the filtrate to a connecting piece or member 5 which opens outside of the module for the discharge of the filtrate.

In the embodiment depicted in FIG. 1, the liquid to be filtered is introduced into the enclosure 2 through an inlet (not shown) and into a space 6. In the enclosure 2, the liquid flows tangentially upwardly on the filtering element 1, which thus acts as a helicoidal slope for the liquid in order to ensure its tangential or cross-flow filtration. After passing the filtering element 1, the liquid flow is transferred (in a manner to be described with reference to FIG. 2) to the helicoidal element 1a, which also acts as a guide slope for the liquid to be filtered, and flows tangentially downwardly therealong. The unfiltered portion flows is discharged downwardly through a space 7 to an outlet (not shown). The module is, of course, closed on its two ends, i.e. on its lower end by a bottom (not shown) where the liquid to be filtered arrives, and on its upper portion by a cover (not shown).

Thus, according to the invention there is an unhindered flow of the liquid to be filtered along a helicoidal path in such a way as to accomplish tangential or cross-flow filtration of the liquid substantially without loss of head, which loss likely would deleteriously affect the energy needed for the circulation of the liquid in the module. Moreover, the module of the invention is designed to allow fabrication by molding and, when in use, easy washing.

Figure 2:
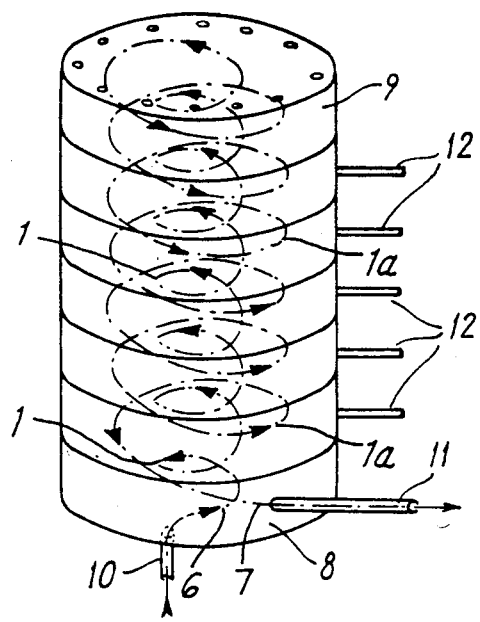
FIG. 2 is a schematic view of a filtration apparatus made up of plural modules.

This modular design furthermore makes possible the construction of a filtration apparatus as illustrated by way of example in FIG. 2. In this embodiment, the apparatus is formed by the superposition of a plurality of modules similar to that described hereinabove and illustrated in FIG. 1, joined to one another by any mechanical means to ensure easy installation and dismantling of the modules and, thereby, their interchangeability, and is closed by a bottom 8 and by a cover 9. The apparatus is fed with the liquid to be filtered through an inlet 10 into a space 6 of the upwardly inclined element 1 of the lowermost module. In this arrangement, the upwardly inclined filtering elements 1 are arranged internally, and the downwardly inclined filtering elements 1a are arranged externally. The liquid circulates upwardly along the filtering helicoidal elements 1 one after another. The liquid flow then is transferred by cover 9 to the downwardly inclined element 1a of the uppermost module, and the liquid circulates downwardly along elements 1a one after the other into a space 7 of the lowermost module and is discharged through an outlet 11. The filtrate issuing from the filtering elements of each module is discharged from each module through a member 12 similar to member 5 of FIG. 1.

As can be seen from the above, each helicoidal filtering element is advantageously limited to a sector less than 360°. With the design of the apparatus illustrated in FIG. 2, the elements are so mounted that the outlet members 12 for the filtrate are mutually displaced, while at the same time ensuring the continuity of the path of the liquid to be filtered on the outer walls of the conduit formed by the helicoidal elements, so that such walls form a continuous helicoidal surface. This arrangement permits an independent recovery of the filtrate issuing from each module with the possibility that a module can be deactivated without affecting the smooth operation of the apparatus simply by shutting off the particular discharge conduit. Thus, for example, if the helix of each module is limited to 330°, an apparatus made up of twelve identical modules and forming at least one eleven-pitch helix, will have at least twelve different outlets of different modules for the filtrate.

Figure 3:
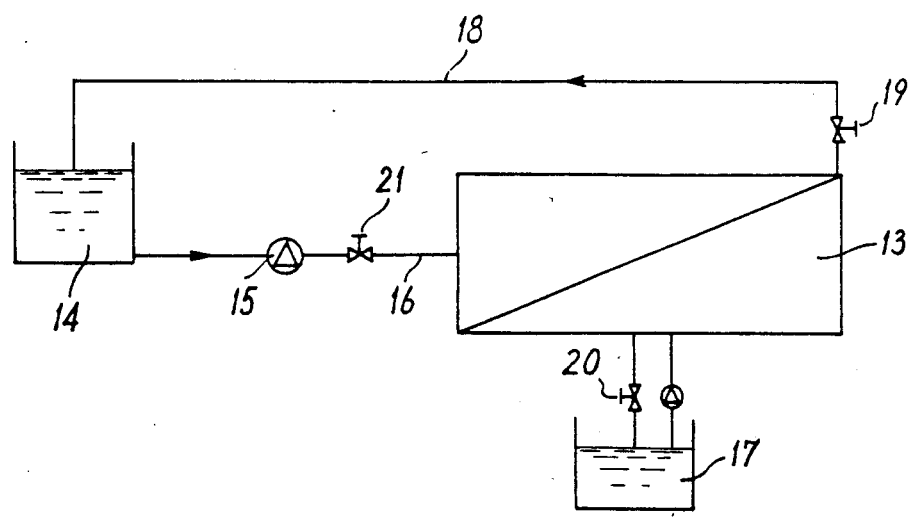
FIGS. 3 to 5 are schematic views of various plant construction according to the invention.

FIG. 3 shows by way of example a plant comprising a filtration apparatus of the type just described with reference to FIG. 2. This apparatus, shown schematically at 13, is fed with the liquid to be filtered delivered from a vat 14 by means of a pump 15 provided in a pipe 16. The filtrate is collected at 17. The apparatus 13 is connected to the vat 14 by a pipe 18 in which a gate valve 19 is provided for recycling of the unfiltered liquid in the vat 14. The pump 15 ensures the feeding of the apparatus 13 with the liquid to be filtered, the recycling of the remaining liquid and also the washing of the apparatus by means of the filtrate by opening or closing gate valves 19, 20 and 21.

Figure 4:
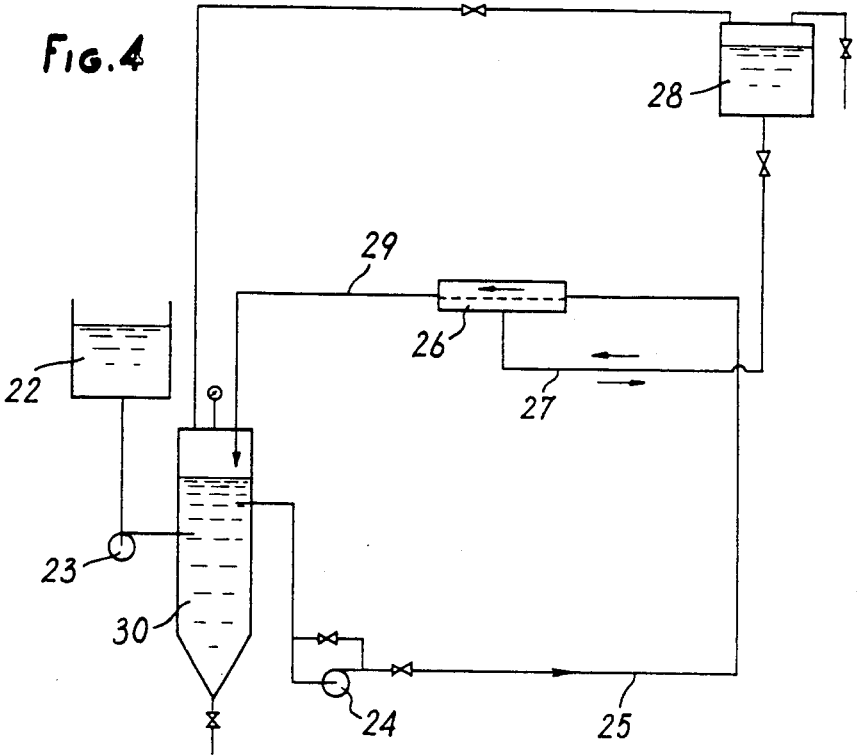

In the specific embodiment shown in FIG. 4, the liquid to be filtered is stored in a vat 22 and is pumped therefrom, by a pump 23, and introduced into an intermediate vat 30 (e.g., a decanter) designed, arranged or provided with means (e.g., a cyclone) for the separation of any solids that may be present in the liquid which then is pumped by a pump 24, provided in a pipe 25, to the filtration apparatus 26 of the invention. From this apparatus, the filtrate is delivered via a pipe 27 to a vessel 28 which is under load in relation to the apparatus 26 and which is positioned at a height sufficient to permit the apparatus 26 to be washed through discharge by gravity of the filtrate from vessel 28 to apparatus 26. A pipe 29 connects the apparatus 26 to the intermediate vat 30 for recycling the remaining liquid toward the apparatus 26.

Figure 5:
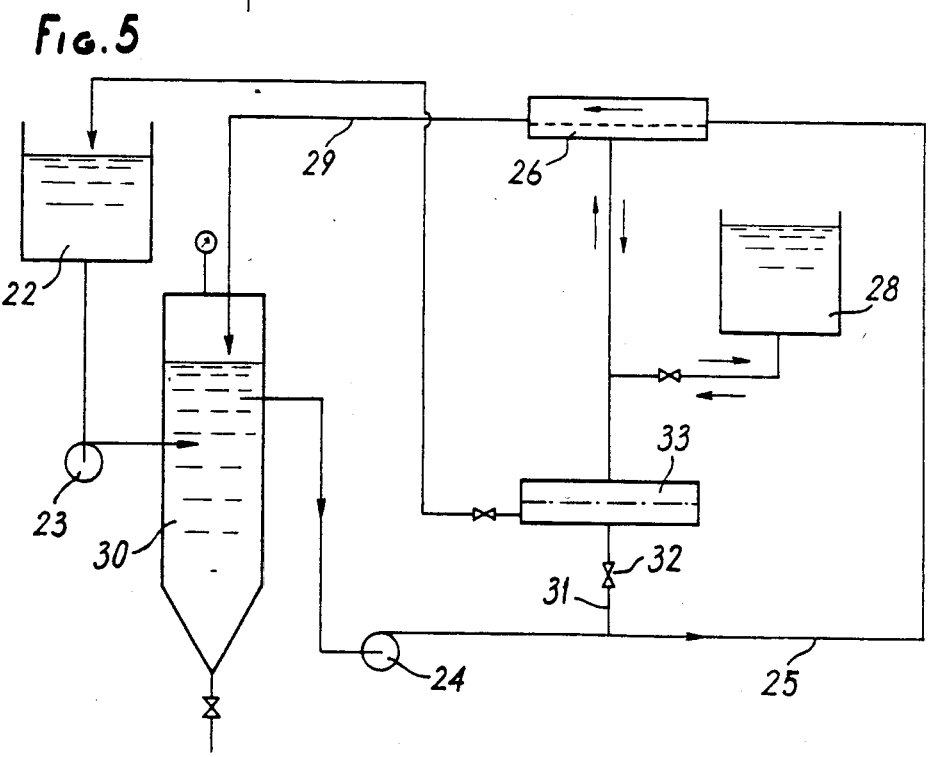

FIG. 5 shows a modification of the plant described hereinabove. In this modification, a flexible, non-porous membrane 33 is inserted in the circuit by means of a pipe 31 having a gate valve 32 connected to pipe 25 for the delivery of the liquid to be filtered to the filtration apparatus 26. With regard to the vessel 28 for receiving the filtrate and the filtration apparatus 26, their position in relation to one another is reversed from the positions of FIG. 4, the filtration apparatus 26 being under load in relation to the vessel 28. During the washing cycle, the membrane 33 allows the periodic delivery, with a pulsated flow, of the filtrate in the washer.

A first example now will be given of the treatment of sea water by means of a plant embodying the invention.

Sea water was treated in a plant made up of ten serially arranged tangential modules designed according to the invention, each being 40 cm in diameter and with a double helix. The filtering material consisted of a cloth of plastic material having meshes with an opening of approximately $2\mu$. The untreated sea water contained 5 ppm of suspended solids and fine particles on the basis of 16,000/ml of particles $>5\mu$ and 50,000/ml of particles $>2\mu$. The sea water was pumped for an hour at a rate of 5 m$^3$/h and with a 30-second shutdown every thirty minutes. The filtrate was collected in a tank placed at a height of 3 m above the apparatus at a rate of 3 m$^3$/h. On the discharge side of the apparatus, the suspended solids from the treated water could not be measured. More than 99% ($<50$ ml) of particles $>5\mu$ were eliminated, and about 95% (approximately 2,500 ml) of particles $>2\mu$ were eliminated.

After 15 days of operation, the flow was reduced to 2.5 m$^3$/h. Cleaning of the filters combining washing with a surface-active product with a return of the filtrate to the modules by gravity enabled restoration of the initial flow. The treated sea water served as a reinjection fluid.

A second example involving the treatment of milk by means of a plant embodying the invention and made up of ten tangential or cross-flow filtration modules, each 40 cm in diameter, with a double helix and arranged in series is given hereinbelow. The filtering material was formed by a microporous material having pores 1.2$\mu$ in diameter. The milk to be treated contained approximately 2.3% proteins and 1.9% fats. The apparatus was fed at an average rate of 5 m$^3$/h with periodic cleaning of filters. The filtrate was collected at an average rate of 0.2 m$^3$/h. There were practically no fats in the filtrate. Fifty percent of the proteins had been retained on the filter. Treatment of milk by means of a plant designed according to the teachings of the invention proves to be more efficient than treatment by centrifuging.

We claim:

1. A cross-flow filtration apparatus for the filtration of particles suspended in a liquid, said apparatus comprising:
   first and second cylindrical enclosures, said first enclosure being positioned coaxially within said second enclosure and spaced radially therefrom;
   a first filtration element having a spiral configuration arranged within said first enclosure and defining therein a first helical path;
   a second filtration element having a spiral configuration arranged between said first and second enclosures and defining therebetween a second helical path;
   the direction of inclination of said first spiral filtration element and said first helical path being opposite to the direction of inclination of said second spiral filtration element and said second helical path;
   means for introducing liquid to be filtered into a first end of said apparatus into one of said helical paths, whereby said liquid flows along the respective one said spiral filtration element and is filtered thereby;
   means at a second end of said apparatus for transferring the flow of said liquid from said one helical path to the other said helical path, whereby said liquid flows along the respective other said spiral filtration element and is further filtered thereby;
   means for discharging concentrated said liquid from said first end of said apparatus; and
   means for discharging filtrate laterally of said apparatus from at least one said spiral filtration element.

2. An apparatus as claimed in claim 1, formed of at least two axially connected modules, each said module having therein said first and second spiral filtration elements defining said first and second helical paths, said first and second helical paths of said axially connected modules being respectively axially connected, and each said spiral filtration element being a sector of less than 360°.

3. An apparatus as claimed in claim 1, wherein said enclosures are arranged vertically, said liquid to be filtered is introduced into the lower end of said one helical path and flows upwardly therethrough, and said liquid flows downwardly through said other helical path.

4. A filtration plant comprising:
   a cross-flow filtration apparatus formed of first and second cylindrical enclosures, said first enclosure being positioned coaxially within said second enclosure and spaced radially therefrom, a first filtration element having a spiral configuration arranged within said first enclosure and defining therein a first helical path, a second filtration element having a spiral configuration arranged between said first and second enclosures and defining therebetween a second helical path, the direction of inclination of said first spiral filtration element and said first helical path being opposite to the direction of inclination of said second spiral filtration element and said second helical path, an inlet at a first end of said apparatus into one of said helical paths, means at a second end of said apparatus for connecting said one helical path to the other said helical path, an outlet from said other helical path at said first end of said apparatus, and means for discharging filtrate laterally of said apparatus from at least one said spiral filtration apparatus;
   a supply of liquid to be filtered;
   storage means for receiving filtrate from said apparatus;
   a filtration pumping means for feeding liquid from said supply to said inlet of said filtration apparatus, for circulating the liquid through said one and then said other helical paths, thereby forming filtrate, and for supplying the filtrate from said discharging means to said storage means; and
   means for washing said at least one filtration element of said filtration apparatus.

5. A plant as claimed in claim 4, wherein said pumping means comprises means for forming a pulsated flow through said helical paths.

6. A plant as claimed in claim 4, wherein said storage means receiving said filtrate is under load in relation to said filtration apparatus and is placed at a height such that plugging of said spiral filtration elements can be eliminated by countercurrently delivering filtrate from said storage means into said apparatus.

7. A plant as claimed in claim 4, further comprising a flexible non-porous membrane arranged between said pumping means and said filtration apparatus and connecting alternately with said storage means and with said supply for eliminating plugging of said spiral filtration elements by countercurrently delivering filtrate from said storage means to said filtration apparatus.

* * * * *